United States Patent [19]

Stribiak

[11] Patent Number: 4,858,302
[45] Date of Patent: Aug. 22, 1989

[54] TOOL DEPLOYMENT APPARATUS

[75] Inventor: John J. Stribiak, Homewood, Ill.

[73] Assignee: Precision Carbide Tool Co., Inc., Nile, Ill.

[21] Appl. No.: 259,186

[22] Filed: Oct. 17, 1988

[51] Int. Cl.$^4$ .................. B23Q 3/157; B25M 3/04
[52] U.S. Cl. ............................. 29/568; 211/69; 211/70.6
[58] Field of Search .............. 29/264, 568, 33 P; 408/3; 211/69, 70.6, 89

[56] References Cited

U.S. PATENT DOCUMENTS

| | | | |
|---|---|---|---|
| 4,520,551 | 6/1985 | Imhof .................................. | 29/568 |
| 4,535,897 | 8/1985 | Remington et al. ............. | 211/70.6 |
| 4,715,108 | 12/1987 | Sugiyama et al. .................. | 29/568 |
| 4,761,876 | 8/1988 | Kosmowski .......................... | 29/568 |

*Primary Examiner*—Z. R. Bilinsky
*Attorney, Agent, or Firm*—Dick and Harris

[57] ABSTRACT

A tool deployment apparatus for guarding the cutting regions of a plurality of rotary cutting tools against damage and wear, and to further enable the simultaneous release and retransmission of the rotary cutting tools into and from a conventional rotary cutting tool pallet. An apparatus housing includes individual tool isolation areas which serve to align and protect the rotary cutting tools housed therewithin, which cutting tools are distally spaced in corresponding relationship to the receiving portions of the conventional tool pallet. A reciprocating bar, which includes elliptically shaped apertures, alternatively releases and obstructs the shaft portions of the rotary cutting tools. The deployment apparatus enables simultaneous release and retransmission of a plurality of rotary cutting tools from their inverted positions within the housing, without exposure to inadvertent contact with retraction elements that facilitate the alternative insertion of the tool shafts into and out of the pallet apertures.

20 Claims, 6 Drawing Sheets

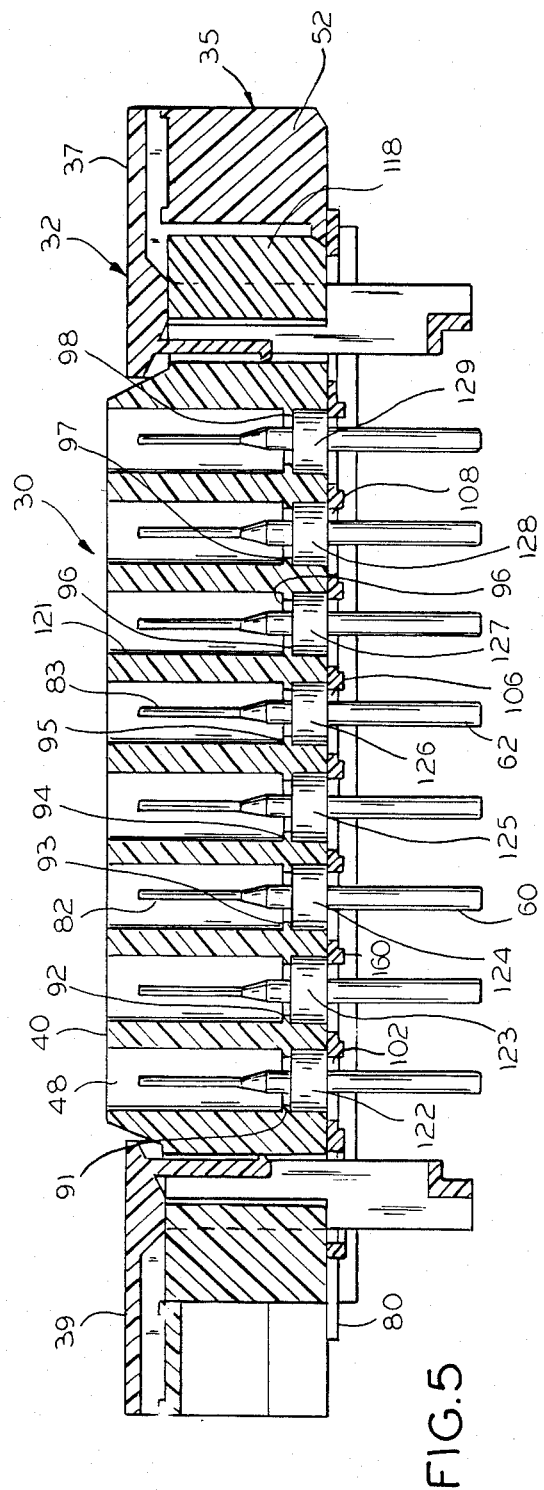
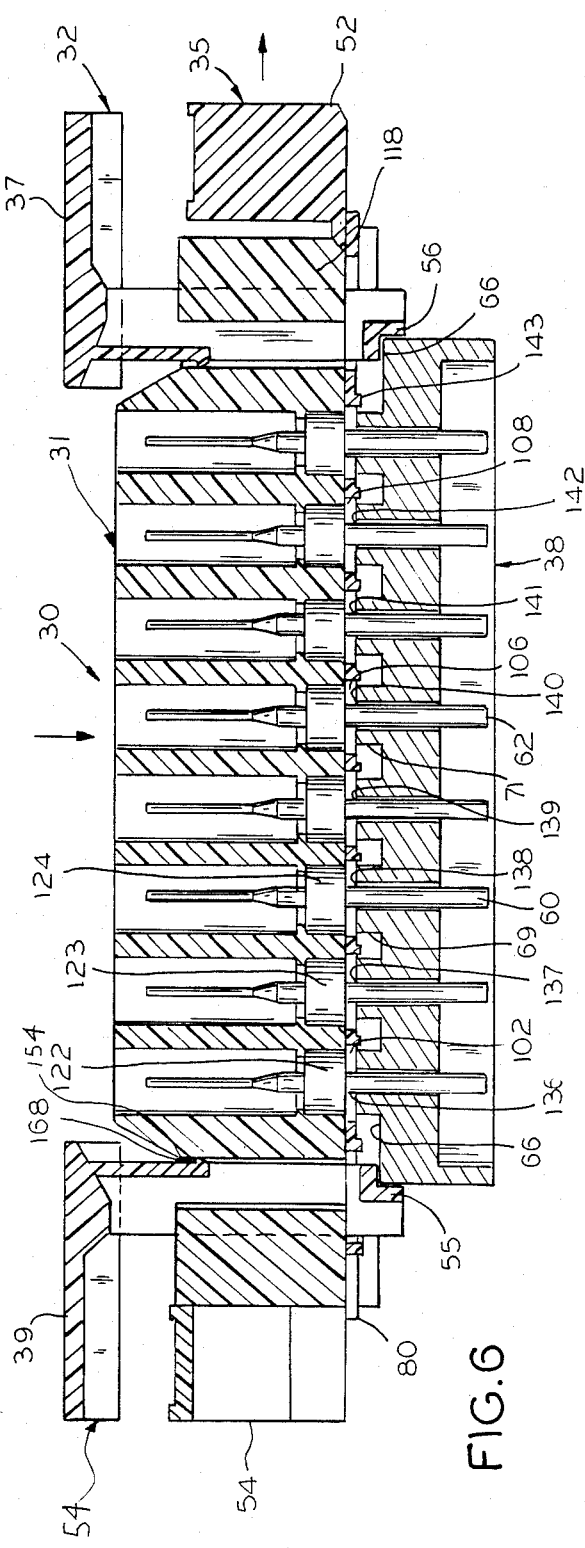

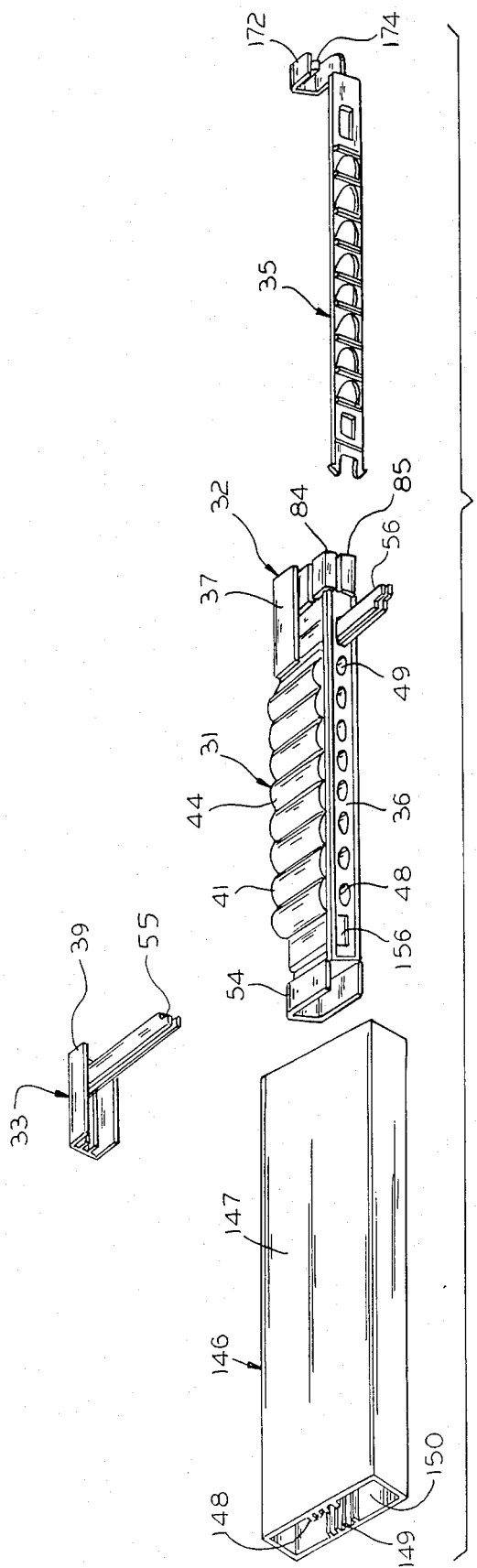
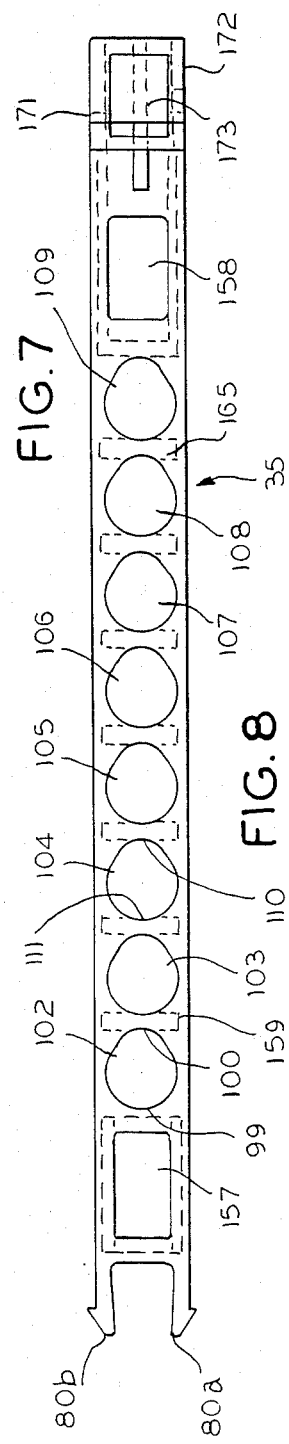
FIG. 7  FIG. 8  FIG. 9

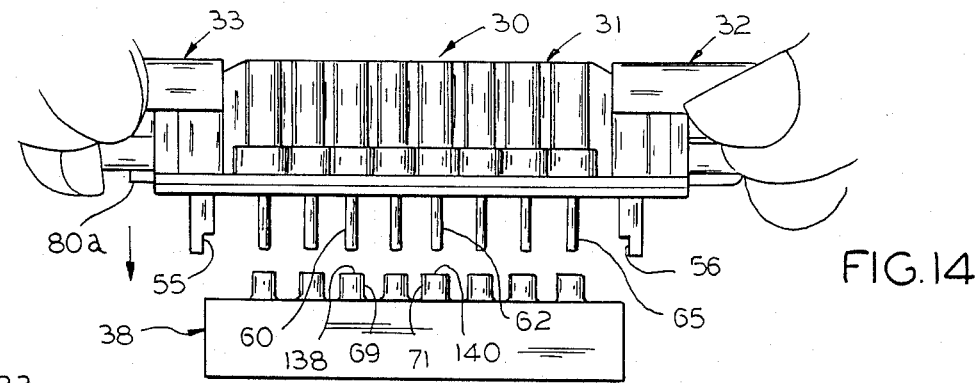
FIG.14
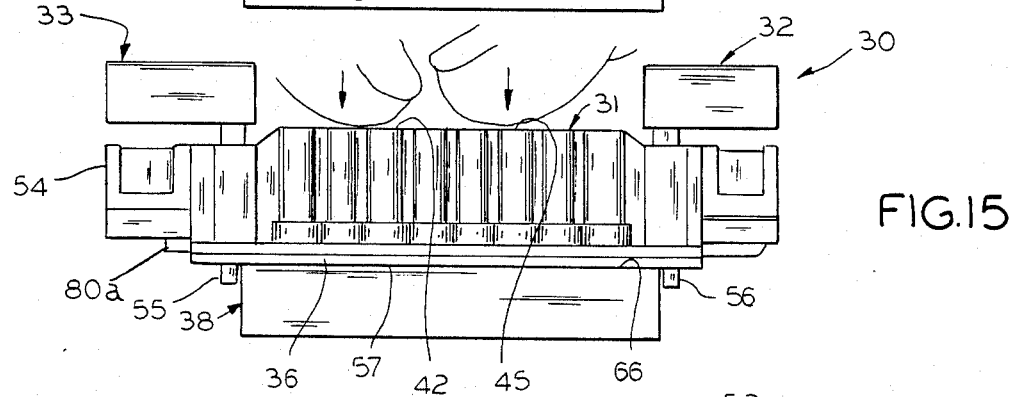
FIG.15
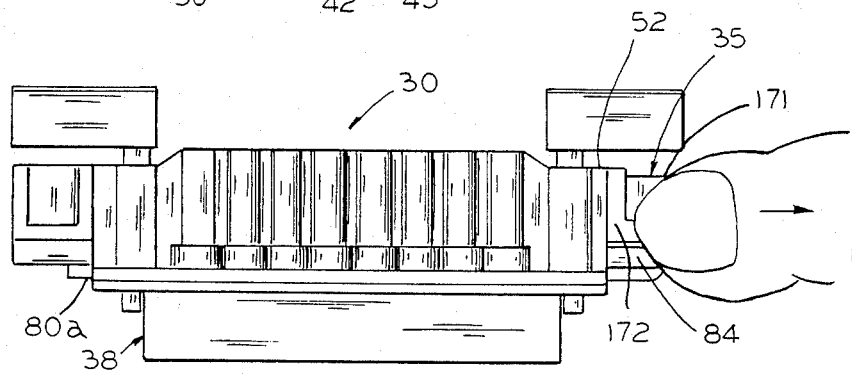
FIG.16
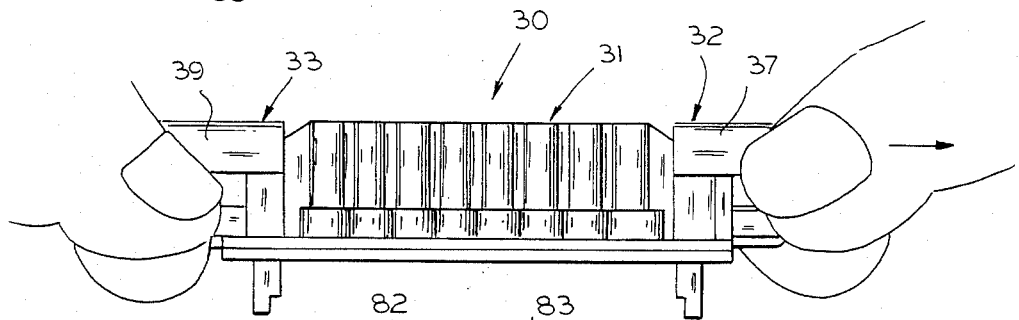
FIG.17
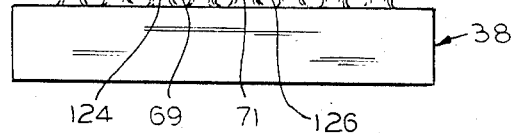

TOOL DEPLOYMENT APPARATUS

BACKGROUND OF THE INVENTION

The present invention relates in general to tool protection and deployment apparatuses and, in particular, to a multiple tool deployment apparatus which simultaneously loads a plurality of conventional rotary cutting tools, in a specified geometric pattern, into a conventional rotary cutting tool retention pallet. These tools, once in the pallet, are used for multi-task drilling operations. When the drilling operations are through, or when a different type, or size of cutting tools is required, the multiple tool deployment apparatus can be re-positioned onto the pallet, so as to facilitate the simultaneous removal of the rotary cutting tools from the same geometric region into which they were originally, restrainably inserted.

For many years, industry has utilized tool retention pallets which are capable of securing a plurality of conventional rotary cutting tools so as to allow for automatic tool loading cooperation for a conventional drilling apparatus, or other machine tool, which is used in multi-task cutting operations. Conventional tool retention pallets have typically provided for acceptance and removal of conventional rotary cutting tools by manual manipulation, and few, if any, have enabled loading and removal of cutting tools, simultaneously, in which a plurality of pre-loaded, pre-sized conventional rotary cutting tools are loaded and unloaded, in a facilitated manner. In spite of the existence and use of pallets to operably secure a multiplicity of conventional rotary cutting tools, few, if any prior art devices, utilize a multiple tool deployment apparatus in cooperation with such pallets, which in turn, cooperates with such conventional rotary cutting tools.

It is thus an object of the present invention to provide a multiple tool deployment apparatus which can cooperate with a plurality of conventional rotary cutting tools and rotary cutting tool retention pallets, for the simultaneous loading and release of such rotary cutting tools into an operable position within the retention pallet, while further allowing for the simultaneous reciprocation of the conventional rotary cutting tools from a loaded pallet, back into the multiple tool deployment apparatus.

Another object of the present invention is to provide a multiple tool deployment apparatus which can greatly reduce the amount of time necessary for the loading, and unloading, of a multiplicity of conventional rotary cutting tools, in cooperation with a rotary cutting tool pallet, while at the same time eliminating the possibility of exposing the cutting edge portions of each such tool to being inadvertently struck or damaged during such loading and unloading.

It is further an object of the present invention to provide a multiple tool deployment apparatus which eliminates the need for manual manipulation of each individual conventional rotary cutting tool, by an operator, during the insertion and removal of such rotary cutting tools into a retention pallet, so as to preclude the risk of injury which may be incurred to an operator during such insertion and removal.

It is additionally an object of the present invention to provide a multiple tool deployment apparatus which is ergonomically designed so as to facilitate the simultaneous group tool loading and unloading during use of the apparatus in association with the reciprocating deployment and/or retransmission of a plurality of conventional rotary cutting tools.

It is still further an object of the present invention to provide a multiple tool deployment apparatus which can facilitate a means for securely storing and handling such tools within a protective environment.

It is also an object of the present invention to provide a multiple tool deployment apparatus which can facilitate the ability to visually observe the specifications for and cutting edge portions of the conventional rotary cutting tools while housed within a protective environment, and to further allow for mechanical restoration of such cutting edge portions without having to remove the conventional rotary cutting tools from the apparatus housing.

These and other objects of the invention will become apparent in light of the present specification and drawings.

SUMMARY OF THE INVENTION

The present invention comprises a tool deployment apparatus for inserting, removing and otherwise deploying, simultaneously, one or more rotary cutting tools of the type that have retaining collars, shank portions, and cutting edge portions, which apparatus further serves to house and shield the cutting edge portions of the one or more rotary cutting tools during such storage and handling of same. The deployment apparatus facilitates the insertion and removal of the one or more rotary cutting tools, respectively, into and from a tool retention pallet means of the type having one or more operably spaced pallet elements which are capable of accepting and releasably retaining at least the shank portion of the one or more rotary cutting tools from their respective positions within the tool deployment apparatus.

The tool deployment apparatus includes tool housing means for retaining, orienting and aligning the position of each of the one or more rotary cutting tools relative to a respective one of the one or more pallet elements which are positioned within the tool retention pallet means. The tool housing has a top region and a bottom region opposite thereto, and further includes one or more tool housing apertures, which apertures are positioned, in a preferred embodiment, along the bottom region of the tool housing means, for exposing at least a portion of the shanks of the rotary cutting tools, respectively. The tool housing additionally includes tool isolation means which operably isolate the cutting edge portions of each adjacently positioned rotary cutting tool, so as to preclude any inadvertent contact with other objects and/or each other. The one or more tool housing apertures are configured in corresponding relationship to, and alignment with, the one or more pallet elements in the tool retention pallet means, for enabling aligned reciprocating deployment of the exposed shank portion, and, in turn, deployment of the respective rotary cutting tools themselves from and back into the tool housing means, through respective positioning and restraint of the one or more shank portions into and out of the pallet elements in the tool retention pallet means. Tool channeling means are operably positioned along the bottom region of the tool housing means so as to alternatively obstruct the release of the rotary cutting tools from the tool housing means, through the tool housing apertures, or to release the rotary cutting tools through the tool housing apertures. Release of the tools through the housing apertures enables transmission of aligned ones of the rotary cutting tools from within the tool housing means, to and into the respective pallet elements of an aligned tool retention pallet means. The tool channeling means further enable the re-transmission of the one or more aligned rotary cutting tools; from the tool retention pallet means back into the tool housing means—again through the plurality of tool housing apertures, thereby enabling recapture of the tools collectively within the tool housing means by the tool channeling means, upon adoption of its obstructing position.

In the preferred embodiment of the invention, the tool deployment apparatus further includes retraction bar means which are operably positioned for cooperation with the tool housing means so as to facilitate the simultaneous removal of the one or more rotary cutting tools, collectively, from the respective aligned pallet elements of the tool retention pallet means. Removal of the tools from their restrained, interference fit, positions within the elements of the pallet occurs during the re-transmission of the rotary cutting tools towards and back into the tool housing means. These retraction bar means include a first force application end and a second pallet contact end, with the first force application end being operably juxtaposed proximate to the top of the tool housing means, and the second pallet contact end being operably juxtaposed proximate to the bottom region of the tool housing means. The retraction bar means further includes pallet locating means operably positioned at the second pallet contact end of the retraction bar means, for facilitating the alignment of the retraction bar means and, in turn, the tool housing means in an aligned position atop the tool retention pallet means during simultaneous re-transmission of the one or more aligned rotary cutting tools from the tool retention pallet means, back into the tool housing means.

In this preferred embodiment, the tool channeling means further includes reciprocating bar means having a first end and a second end located opposite to the first end. The reciprocating bar means are positioned substantially along the bottom region of the tool housing means, so as to provide for slidable, reciprocable, alternating obstruction and full exposure of the tool housing aperture means, to, in turn, alternatively block and release for passage therethrough, the rotary cutting tools which are operably positioned within the tool housing means. The reciprocating bar means include one or more bar apertures which are configured therewithin so as to be capable of alternative misalignment and alignment with the tool housing apertures of the tool housing means. The obstruction of the rotary cutting tools within the tool housing means occurs upon the misalignment of the one or more bar apertures relative to the tool housing apertures, while the alternative transmission of the rotary cutting tools occurs upon full alignment of the one or more bar apertures relative to the tool housing apertures.

The reciprocating bar means further includes reciprocation restraint means which are integrally attached to the second end of the reciprocating bar means, which restraint means serve to restrain and control the range of reciprocation for the reciprocating bar means. The reciprocation restraint means ensure appropriate alignment of the one or more bar apertures in the aligned tool releasing position, relative to respective ones of the one or more tool housing apertures of the tool housing means. As a result, the reciprocation restraint means permit the releasable, indeed reversible transmission of the rotary cutting tools, alternatively from and back into the tool housing means. The reciprocation restraint means further maintain the reciprocating bar means in operable affixation to the tool housing means.

In one embodiment, the reciprocation restraint means comprise spring biased anchor means located at the second end of the reciprocating bar means. This anchor means is capable of engagement with at least a portion of the tool housing means proximate to the second end, to permit the reciprocating bar means to reciprocate within a defined range, between an aligned and the next adjacent non-aligned position, respectively.

The one or more bar apertures of the reciprocating bar means are substantially elliptically shaped, each of these elliptical shapes having a narrow portion and a wide portion, in which the narrow portion of the elliptically shaped aperture serves to at least partially obstruct alignment and thus passage of the tool shaft through the tool housing aperture. Such partial obstruction of alignment serves to preclude the opportunity for transmission of the one or more rotary cutting tools from and/or back into the tool housing means when the reciprocating bar means is located in its transmission obstructing position.

The reciprocating bar means further include grasping means which are operably attached at its first end. These grasping means serve to facilitate the manual positioning of the reciprocating bar means, to in turn, enable the positioning of the one or more bar apertures into either of the alternative obstructing or non-obstructing positions, relative to the tool housing apertures in the tool housing means. Accordingly, the grasping means enables the alternative blockage and transmission of the rotary cutting tools through the bar apertures for retention by and re-transmission from the pallet elements. Preferably, the grasping means further includes limiting means which serve to operably describe a desired distinct alternative position for locating of the reciprocating bar means. These limiting means comprise one or more biased detents which are located in the grasping means which releasably fasten into mated notches in the housing, thereby allowing for operable reciprocation and location of the grasping means, and reciprocating each relative to the tool housing means.

In the preferred embodiment of the invention, the tool isolation means comprises one or more substantially cylindrically shaped enclosure elements for shielding the one or more rotary cutting tools, respectively, within the tool housing means. The one or more substantially cylindrically shaped enclosure elements span from the top region to the bottom region of the tool housing means to enshroud and isolate the entirety of at least the cutting edge portions of the rotary cutting tools which are positioned within the tool housing means. The substantially cylindrically shaped enclosure elements include, at the bottom region, diameters which are configured to slidingly accept the conventional retaining collars of the one or more rotary cutting tools. These retaining collars are further maintained at the bottom region of the tool housing means prior to transmission, by shoulder means which are positioned within the enclosure elements. Preferably, the portion of the tool isolation means located proximate to the top region of the tool housing means further includes orifice means which are utilized to facilitate inspection and mechanical manipulation of the cutting edge portions of the rotary cutting tools which are enclosed within the tool housing means. With the top portion of the isolation means so apertured, the tool may be examined by magnifying instruments, as well as secured or sharpened, without removal from this shrouded environment.

The tool housing apparatus is preferably configured in such a way so as to contain a linear row of rotary cutting tools in corresponding alignment with an alignable linear row of pallet elements embodied by the tool retention pallet means. This entire linear row of a plurality of rotary cutting tools is thus capable of being simultaneously transmitted to, and retracted from, the alignable linear row of the pallet elements.

In another embodiment of the invention, the tool housing apparatus is configured in such a way so as to contain a two-dimensional geometric array of rotary cutting tools which are positioned in corresponding alignment with an equivalent two-dimensional geometric array of pallet elements embodied by the tool retention pallet means. The two-dimensional geometric array of the rotary cutting tools is thus likewise capable of being simultaneously transmitted to, and retracted from, the alignable two-dimensional geometric array of pallet elements.

Indicia means may be operably and visibly applied to the tool housing means, to facilitate the identification of structural specifications relevant to the rotary cutting tools which are contained within the tool deployment apparatus.

In the preferred embodiment of the invention, the tool deployment apparatus further includes apparatus containment means which are used for sealing the tool housing means, and the rotary cutting tools which are contained therewithin. The apparatus containment means lends further protection to the overall apparatus and segregation to the cutting edges of the tools so as to permit damage free storage handling and shipping. Preferably, the apparatus containment means comprises a containment sleeve capable of being telescopically affixed and removed from a position about the tool housing means. This apparatus containment means may be maintained in its affixed position by means of an interference fit between portions of the tool housing means.

Both the apparatus containment means and the tool housing means may be embodied of a substantially transparent material to allow for the visual observation of the rotary cutting tools which are contained therewithin the tool deployment apparatus, regardless of whether they are covered by containment means or not. Moreover, the apparatus containment means may further include indicia means operably and visibly applied to the external side of the apparatus protection means, to facilitate identification of the structural specifications of the rotary cutting tools operably positioned within the tool deployment apparatus. Likewise, the tool deployment apparatus is contemplated as being fashioned of a substantially rigid plastic material for structural and operational purposes.

BRIEF DESCRIPTION OF THE DRAWINGS

FIG. 5 of the drawings is an elevated crosssectional view of the multiple tool deployment apparatus of FIG. 3 particularly showing the positioning of the conventional rotary cutting tools obstructed within the individual isolation sleeve of the tool housing means;

FIG. 6 of the drawings is an elevated crosssectional view of the multiple tool deployment apparatus of FIG. 4 immediately prior to transmission of the rotary cutting tools out of or into the housing, for cooperation with the individual pallet elements of the rotary cutting tool retention pallet and particularly showing the release position of the reciprocating grasping means as well as the vertical positioning of the retraction bars;

FIG. 7 of the drawings is an exploded perspective view of the multiple tool deployment apparatus showing, in particular, the reciprocating bar means, tool housing construction, as well as the retraction bars and protective apparatus housing containment components;

FIG. 8 of the drawings is a top plan view of the reciprocating bar means particularly revealing the plurality of elliptically shaped apertures running along its longitudinal axis, as well as showing the spring biased anchor means clip which serves to facilitate yet limit alignment of the reciprocating bar with the housing apertures;

FIG. 9 of the drawings is an elevated side view of the reciprocating bar, particularly showing a biased detent positioned in the grasping member, as well as showing the plurality of alignment tabs located on the bottom of the reciprocating bar;

FIGS. 14 through 21 sequentially display the operative steps for respectively deploying and re-transmitting a plurality of cutting tools into and from a conventional tool pallet, by which FIG. 14 is an elevated front view of the multiple tool deployment apparatus shown in its tool loaded and obstructed position in alignment with the rotary cutting tool retention pallet just prior to deploying the tools into the individual pallet elements;

FIG. 15 of the drawings is an elevated front view of the multiple tool deployment apparatus after the tool housing has been appropriately seated upon the rotary cutting tool retention pallet, and particularly showing the extended positioning of the retraction bars at which time the exposed shafts of the tools engage and are grasped, by interference fit by the respective pallet elements;

FIG. 16 of the drawings is an elevated front view of the multiple tool deployment apparatus showing the horizontal manipulation of the grasping portion of the reciprocating bar so as to enable sliding of the elliptically shaped apertures of the reciprocating bar into a non-obstructing aligned, tool transmission;

FIG. 17 of the drawings shows the multiple tool deployment apparatus in elevated front view after the apparatus has been separated from the pallet after simultaneous release of the rotary cutting tools in which the retaining collars for the tools abut the top portions of the pallet elements;

FIG. 18 of the drawings is an elevated front view of the multiple tool deployment apparatus just prior to positioning over a linear row of conventional rotary cutting tools, for reciprocating re-transmission back into the tool housing;

FIG. 19 of the drawings is a front elevational view of the multiple tool deployment apparatus after it has been re-placed onto the rotary cutting tool retention pallet, particularly showing re-direction of the reciprocating bar in order to re-lock the tools into position within the tool housing, at which time the elliptically shaped apertures of the reciprocating bar move back into their tool obstructing positions;

FIG. 20 of the drawings is an elevated front view of the multiple tool deployment apparatus after the reciprocating bar has been positioned into its obstructed position, particularly showing the operation of the retraction bars relative to both the tool housing and pallet means, when, force is applied on both the bottom and the top portions of the retraction bars so as to facilitate retraction of the rotary cutting tools, simultaneously from the elements; and FIG. 21 of the drawings is an elevated front view of the multiple tool deployment apparatus after it has been separated, with the plurality of re-transmitted tools, from the tool retention pallet, particularly showing the positions of the exposed shank portions of the conventional rotary cutting tools after re-transmission is back into the individual isolation sleeves of the tool housing.

DETAILED DESCRIPTION OF THE DRAWINGS

Figure 1:
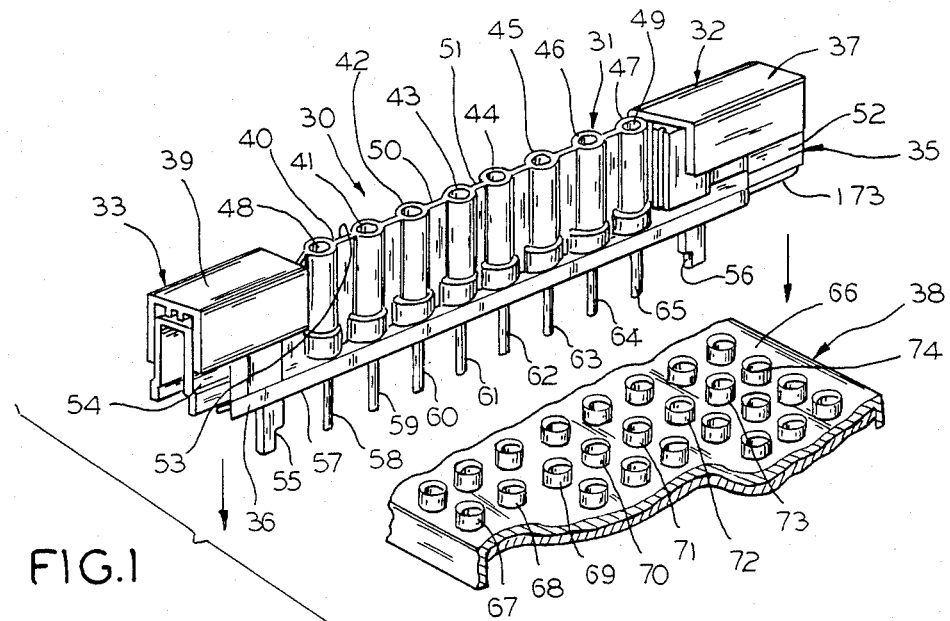
FIG. 1 of the drawings is a perspective view of the multiple tool deployment apparatus, prior to the insertion of the conventional rotary cutting tools into a rotary cutting tool retention pallet, showing in particular the extended position of the shank portions of the conventional rotary cutting tools when the tools are housed within individual isolation chambers.

While this invention is susceptible of embodiment in many different forms, there is shown in the drawings and will herein be described in detail, several specific embodiments with the understanding that the present disclosure is to be considered as an exemplification of the principles of the invention and is not intended to limit the invention to the embodiments illustrated.

Figure 2:
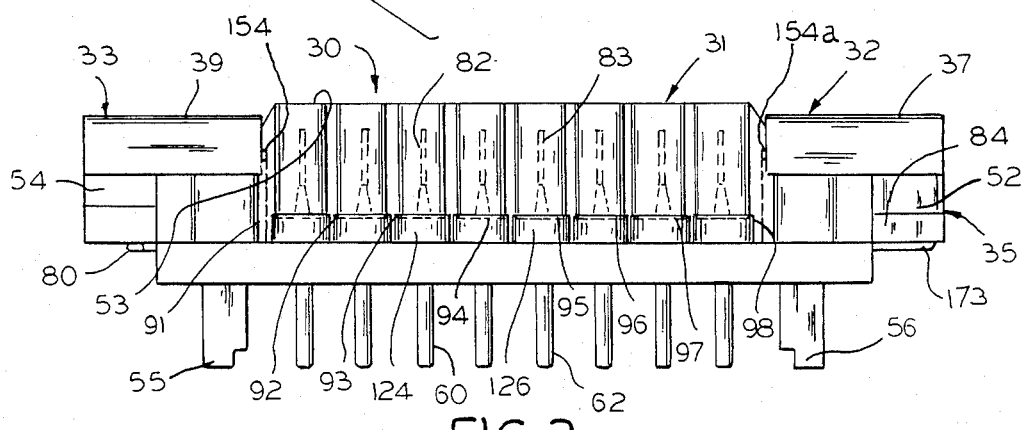
FIG. 2 of the drawings is an elevated front view of the multiple tool deployment apparatus in partial phantom, showing the restricted positioning of the retaining collars, as well as the cutting edge portions of each of the conventional rotary cutting tools within the individual isolation sleeves of the tool housing.
Figure 4:
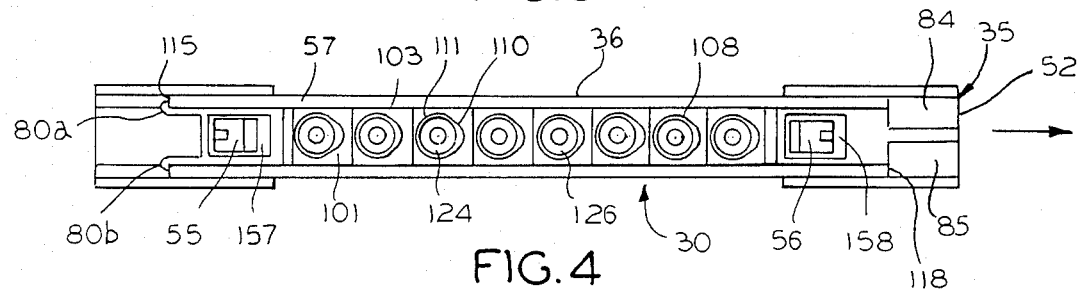
FIG. 4 of the drawings is a bottom plan view of the multiple tool deployment apparatus in its tool releasing or tool transmitting position, particularly showing the positioning of the elliptical apertures of the reciprocating bar means in their non-obstructing position.

Multiple tool deployment apparatus 30 is shown in FIG. 1 as including tool housing means 31, retraction bar means 32 and 33, as well as reciprocating bar means 35. Tool housing means 31 includes top region 53, and bottom region 36. Bottom region 36 includes bottom edge 57 which abuts with top surface 66 of rotary cutting tool retention pallet 38 when tool housing 31 is seated thereon. Top region 53 is made up of individual isolation sleeves 40 through 47 which serve as protective shields for cutting edge portions of the rotary cutting tools, such as cutting edge portions 82 and 83, as shown in FIG. 2, of conventional rotary cutting tools 60 and 62. Cutting tools 58 through 65 are secured within the plurality of individual isolation means 40 through 47 by horizontally sliding reciprocating bar means 35, along the longitudinal axis of tool housing 31, here shown in its tool obstructing position. In order to release conventional rotary cutting tools 58 through 65 from housing means 31 or, in the alternative, to enable reciprocation of rotary cutting tools 58 through 65 back from the pallet and into tool housing means 31, as desired, reciprocating bar means 35 is simply slid back into its non-obstructing tool transmitting position, as shown in FIG. 4.

Isolation means such as isolation sleeves 40 through 47 of tool housing means 31 are designed with internal channels, such as internal channels 48 and 49, which run the entire length of each isolation sleeves. Isolation sleeves 40 through 47 are separated by walls, such as walls 50 and 51, which serve to provide structural support to the overall tool housing means 31. Internal channels, such as internal channels 48 and 49, are configured to a diameter large enough to accept, yet isolate the cutting edge portion of a tool, such as cutting edge portion 82. In addition, these internal channels allow for visual inspection of the cutting edge portions, such as cutting edge portions 82 and 83, as shown in FIG. 2, of conventional rotary cutting tools 58 through 65, thereby enabling one to make an appropriate determination as to the condition of the cutting edge portions without the need for actually removing the tools. In addition, should any mechanical operations, such as sharpening, need to be performed on the tools, cutting edge portions, then this can be accomplished without having to remove the cutting tool from its respective isolation sleeve.

Retraction bars 32 and 33 consist of top ends 37 and 39, and bottom ends 56 and 55 respectively. When multiple tool deployment apparatus 30 is removed from rotary cutting tool retention pallet 38, retraction bars 32, 33 eventually come to a resting position upon the top of their respective grasping portions 52 and 54 of tool housing means 31 and reciprocating bar means 35, respectively. In addition, the structural support 173 which is an integral part of of grasping portion 52, is also revealed in FIG. 1. This structural support, along with grasping portion 52, is actually part of the reciprocating bar 35. It is this area of the reciprocating bar which is mechanically manipulated so as to enable the slidable movement of the bar.

Rotary cutting tool retention pallet 38 is also shown in FIG. 1, and includes top surface 66, and pallet elements 67 through 74. Multiple tool deployment apparatus 30 is capable of reciprocal cooperation with rotary cutting tool retention pallet 38, so that conventional rotary cutting tools 58 through 65 can be operably received or retracted from the pallet elements while exerting only a minimal amount of effort and time. Furthermore, any risk of injury which may result from any physical manipulation of the rotary cutting tools is greatly reduced since the cutting tools are not actually handled by a human operator during their loading and unloading into and from pallet 38.

Multiple tool deployment apparatus 30 is shown in partial phantom in FIG. 2, particularly showing the positioning of rotary cutting tools 58 through 65, as shown in FIG. 1, in their operable position within individual isolation sleeves 40 through 47, also as shown in FIG. 1. As can be seen, cutting edge portions, such as 82 and 83, are precluded from inadvertent contact with internal walls, such as internal wall 121, as shown in FIG. 5, of the isolation sleeves 40 through 47. The cutting edge portions, such as cutting edge portions 82 and 83 are maintained in uniform alignment within isolation sleeves 40 through 47 due to the configuration of isolation means shoulder portions 91 through 98. Shoulder portions 91 through 98 are configured to a diameter which is slightly smaller than the diameter of retaining collars 122 through 129, as shown in FIG. 5, of rotary cutting tools 58 through 65, as shown in FIG. 1. Accordingly, shoulder portions 91 through 98 actually preclude the cutting edge portions of the cutting tools from being inoperably aligned within top region 53 of tool housing means 31.

Figure 3:
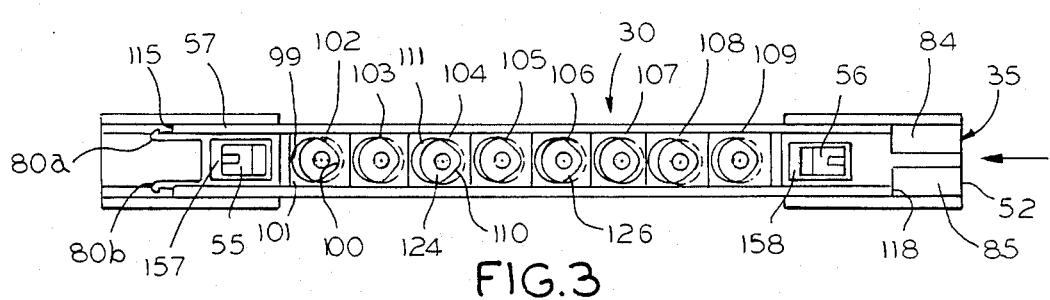
FIG. 3 of the drawings is a bottom plan view of the multiple tool deployment apparatus particularly showing the reciprocating bar means being positioned in an obstructed position so as to preclude the inadvertent release of the conventional rotary cutting tools.
Figure 11:
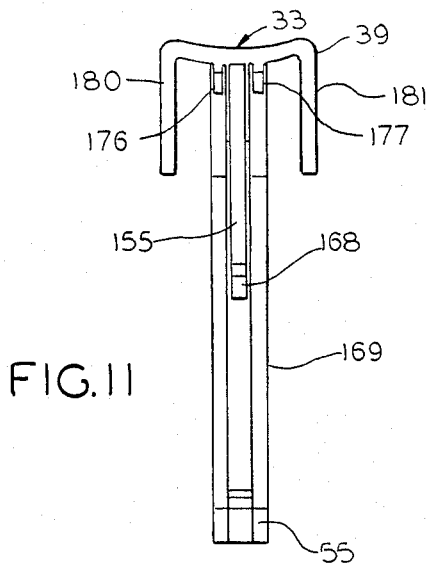
FIG. 11 of the drawings is an elevated side view of the retraction bar of FIG. 10, particularly showing the structure for the spring biased securing notch located within the shaft of the retraction bar.
Figure 12:
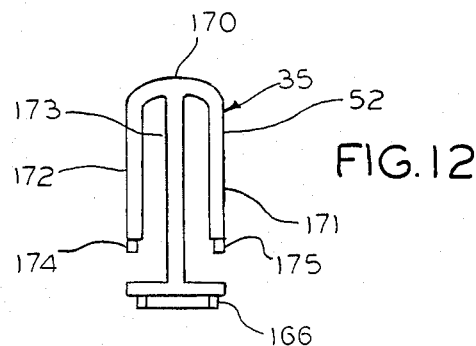
FIG. 12 of the drawings is an elevated side view of the reciprocating bar, showing in particular, the resilient grasping means portion with two biased detents located thereon for snap-locking purposes.

FIG. 2 also shows the positioning of reciprocating bar 35, and retraction bars 32 and 33, when multiple tool deployment apparatus 30 is in its storing and/or handling position. As can be seen, top ends 39 and 37 of retraction bars 33 and 32 respectively, rest upon the tops of grasping portion 54 of tool housing means 31, and grasping portion 52 of reciprocating bar means 35 respectively. As a result, bottom ends 55 and 56 of retraction bar means 33 and 32, respectively, are extended to approximately the same longitudinal dimension as that of the exposed shanks of conventional rotary cutting tools 58 through 65, as shown in FIG. 1. Retraction bars 32 and 33 are precluded from being inadvertently removed from tool housing means 31 due to retaining notches such as retaining notch 168, which are located on shafts of retraction bars 32 and 33, such as shaft 169, as shown in FIG. 11. The retaining notches cooperate with blocking bars, such as blocking bars 154 and 154(a), which are located within the internal walls of retraction bar channels, such as channel 156, of tool housing means 31 as shown in FIG. 7. Also shown in FIG. 2 is the positioning of reciprocating bar 35 when it is in its tool obstructing position. When in this position, the tips 80(a) and 80(b), of spring clip 80 which is used for alignment purposes, are located away from end edge 115 of bottom region 36 of tool housing means 31, as shown in FIG. 3. Extended portion 84 of tool housing means 31 is also shown in FIG. 2. Extended portion 84 cooperates with detent 174 of grasping portion 52, as seen in FIG. 12, so as to preclude the inadvertent movement of reciprocating bar 35.

A bottom view of multiple tool deployment apparatus 30 is shown in FIG. 3 so as to particularly reveal bottom surface 101 of reciprocating bar 35 being juxtaposed to bottom edge 57 of tool housing means 31. Bottom surface 101 comprises a plurality of elliptically shaped voids 102 through 109, which are aligned to alternatively release and obstruct the retaining collars of the rotary cutting tools. Each elliptically shaped void consists of a wide portion, and a narrow portion such as wide portions 99 and 111, and narrow portions 100 and 110, of voids 102 and 104, respectively. When reciprocating bar 35 is slid into its tool obstructing position, as indicated in FIG. 3, the narrow portions of elliptically shaped voids 102 through 109 serve to partially obstruct retaining collars 122 through 129, as seen in FIG. 5, of conventional rotary cutting tools 58 through 65, from passing therethrough. This obstructing position is achieved by pushing tips 80(a) and 80(b) of spring clip 80 of reciprocating bar 35 away from end edge 115 of bottom region 36, as seen in FIG. 1, of tool housing means 31. Such action is accomplished by squeezing side flaps 171 and 172 of grasping portion 52 so that detents 175 and 174 will be released from extended portions 85 and 84. Accordingly, such release will thereby allow for the movement of reciprocating bar 35 in the direction of the arrow, until the end of grasping portion 52 abuts with end edge 118 of tool housing means 31.

Reciprocating bar 35 is designed with openings, such as openings 157 and 158, which are oppositely positioned along the longitudinal axis of the bottom surface 101 of reciprocating bar 35. These openings permit the horizontal movement of reciprocating bar 35 to and from its non-obstructing position, while at the same time enabling vertical movement of retraction bars 33 and 32 respectively, without hindering their movement during operation. As can be seen, when reciprocating bar 35 is positioned in its obstructing position, as seen in FIG. 3, openings 157 and 158 reveal a larger gap located to the left side, with respect to the drawing, of bottom ends 55 and 56 of retraction bars 33 and 32 respectively.

FIG. 4 shows a bottom view of multiple tool deployment apparatus 30, particularly showing bottom surface 101 of reciprocating bar 35 in its non-obstructing position. Reciprocating bar 35 is slidably secured within tool housing means 31 by having bottom edge 57 form a rail for reciprocating bar 35 to ride upon. In order to achieve this result, grasping portion 52 of reciprocating bar 35 is retracted until tips 80(a) and 80(b) of spring clip 80 abut with end edge 115 of bottom region 36 of tool housing means 31, as shown in FIG. 2. Accordingly, grasping portion 52 of reciprocating bar 35 is pulled away from abutment with end edge 118. Once this occurs, the wide portions of elliptically shaped voids 102 through 109 are slid into operable position, thereby precluding the narrow portions from obstructing retaining collars 122 through 129 of conventional rotary cutting tools 58 through 65, and therefore the tools themselves, as shown in FIG. 1 and FIG. 3, so as to allow for the release or acceptance from, or back into, tool housing means 31. Additionally, when reciprocating bar 35 is in its non-obstructing position, openings 157 and 158 reveal a majority of exposed area on the right side of bottom ends 55 and 56 of retracting bars 33 and 32, respectively, as shown in FIG. 4. Also, grasping portion 52 has been released from the extended portions 84 and 85 of tool housing means 31. This position is accomplished by squeezing side flaps 172 and 171 simultaneously. As such, detents 174 and 175 are released from tool housing means 31, as shown in FIG. 12, and thereby allow for slidable movement of reciprocating bar 35.

Multiple tool deployment apparatus 30 is shown in partial cross-sectional view in FIG. 5, showing the obstructed position of reciprocating bar 35, where elliptically shaped voids 102 through 109 block the release of retaining collars 122 through 129 of rotary cutting tools 58 through 65. As can be seen, grasping portion 52 of reciprocating bar 35 is in abutment with end portion 118 of tool housing means 31, and accordingly, spring clip 80 is in its fully extended position. Also, the cutting edge portions of rotary cutting tools 58 through 65 can be seen within internal channels of each of individual isolation sleeves 40 through 47, as shown in FIG. 1 which additionally shows the approximate amount of space which is located between the cutting edge portions of rotary cutting tools 58 through 65 and the internal walls of isolation sleeves 40 through 47. Shoulder portions 91 through 98 are also shown in FIG. 5 whereby it can be seen that retaining collars 122 through 129 are precluded from entrance beyond that point, which in turn also serves to appropriately align the cutting tools within the tool housing means. Top ends 37 and 39 of retracting bars 32 and 33 respectively, as shown in FIG. 1, are shown in their seated position. This seated position is achieved when upward force is not being applied to bottom ends 55 and 56 of retracting bars 33 and 32, respectively, as shown in FIG. 1. Also shown is alignment means, such as 160, of reciprocating bar means 35.

FIG. 6 shows multiple tool deployment apparatus 30 in partial cross-section, in particular, the operable cooperation between multiple tool deployment apparatus 30 and rotary cutting tool retention pallet 38. When apparatus 30 has been operably lowered upon pallet 38, shank portions of rotary cutting tools 58 through 65, as shown in FIG. 1, are loaded into bores 136 through 143 of pallet elements 67 through 74, as shown in FIG. 1. As apparatus 30 is being mechanically pressed down upon pallet 38, bottom ends 55 and 56 of retraction bars 32 and 33 respectively, eventually abut with top surface 66 of rotary cutting tool retention pallet 38. Once such abutment occurs, multiple tool deployment apparatus 30 is continuously pushed down upon pallet 38 until the bottom portions of retaining collars 122 through 129, as shown in FIG. 5, are in approximate abutment with the top surfaces of pallet elements 67 through 74, as shown in FIG. 1. This desired positioning and alignment can further be determined by observing the positioning of retraction bars 32 and 33, which will have been completely extended upwardly so that top regions 37 and 39, respectively, retraction bars 32 and 33 will have become completely unseated from the top of grasping portion 54 of tool housing means 31, and top 170, as shown in FIG. 12, of grasping portion 52. Retraction bars 32 and 33 are then precluded from being pushed out of tool housing means 31, after they have been completely extended, as the result of retaining notch 168, which cooperates with channels, such as channel 156, as shown in FIG. 7, and tool housing means 31. After multiple tool deployment apparatus 30 has been completely positioned upon pallet 38, release of rotary cutting tools 58 through 65 from tool housing means 31 is achieved by mechanically squeezing side flaps 172 and 171 of grasping portion 52 of reciprocating bar 35 so as to release detents 174 and 175, respectively, as shown in FIG. 12. Such release thereby enables elliptically shaped voids 102 through 109 of reciprocating bar 35 to be slid into a nonobstructing position with respect to rotary cutting tools 58 through 65, as shown in FIG. 1. By pulling grasping portion 52 away from end edge 118 of tool housing means 31, reciprocating bar 35 can then be slid into its nonobstructed position. Any further movement of reciprocating bar 35 is avoided due to the abutment of the tips 80(a) and 80(b) of spring clip 80 with end edge 115 of tool housing means 31, as shown in FIG. 3. Furthermore, when such abutment occurs, elliptically shaped voids 102 through 109 will be properly aligned with the internal channels of isolation sleeves 40 through 47 in such a manner as to facilitate the release of the conventional rotary cutting tools 58 through 65 from their individual isolation sleeves 40 through 47 and, in turn, into an operable position within pallet elements 67 through 74, all as shown in FIG. 1, of rotary cutting tool retention pallet means 38. When this has been achieve, multiple tool deployment apparatus 30 can be removed from the loaded pallet 38 without resistance, through vertical extraction.

In FIG. 7, multiple tool deployment apparatus 30 is shown in a partially exploded view, and particularly reveals reciprocating bar 35, tool housing means 31, retraction bars 32 and 33, as well as protective housing cover 146. Elliptically shaped voids 102 through 109, as shown in FIG. 3, of reciprocating bar 35 are equivalent in number, as well as spacing, with the internal channels of isolation sleeves 40 through 47, as shown in FIG. 1. Reciprocating bar 35 is also designed with openings 157 and 158, shown in FIG. 8, which are aligned in corresponding relationship with the channels, such as channel 156, of bottom region 36 of tool housing means 31, so as to allow for the unobstructed vertical manipulation of retraction bars 33 and 32. When reciprocating bar 35 is operably positioned juxtaposed to bottom region 36 of tool housing means 31, as shown in FIG. 6, such as detents 174 and 175, of side flaps 172 and 171 respectively, as shown in FIG. 12, cooperate with extended portions 84 and 85 of tool housing means 31, so as to limit the inadvertent movement of reciprocating bar 35 into an undesired position. When multiple tool deployment apparatus 30 is in its fully assembled position, with or without conventional rotary cutting tools 58 through 65, as shown in FIG. 1 and FIG. 16, apparatus 30 can be inserted into protective housing cover 146 for shipping and/or storing. Proper insertion of tool housing 31 into protective housing cover 146 can be achieved by having top ends 39 and 37 of retraction bars 33 and 32, respectively, seated in abutment with the top surface of grasping portion 54 of tool housing 31, and top surface 170 of grasping portion 52, as shown in FIG. 12, of reciprocating bar 35, respectively. Accordingly, bottom ends 56 and 55 will be fully extended. Protective housing cover 146 has an internal area 150 which incorporates internal ribs 148 and 149. Internal ribs 148 and 149 are configured in such a way so as to cooperate with the outer longitudinal dimensions of multiple tool deployment apparatus 30. Such a configuration during operable cooperation therebetween allows for the servicing of top ends 39 and 37 of retraction bars 33 and 32, respectively, between the top row of internal ribs 148 and 149, and the top internal surface of protective housing cover 146. When multiple tool deployment apparatus 30 is completely housed within protective housing cover 146, internal ribs 148 and 149 serve to provide an interference fit which thereby precludes the inadvertent movement of the multiple tool deployment apparatus 30 therewithin. Furthermore, protective housing cover 146 is made of a substantially transparent material which enables the entire apparatus 30 to be visibly observed through external surface 147 of protective housing cover 146.

Reciprocating bar 35 is shown in top view in FIG. 8, particularly showing elliptically shaped voids 102 through 109. The narrow portions, such as narrow portion 100 and 110, of elliptically shaped voids 102 through 109 abut with edges of alignment means 159 through 166, as shown in FIG. 9, and the wide portions, such as wide portions 99 and 111, of elliptically shaped voids 012 through 109 are configured juxtaposed to alignment means 159 through 165 and 167, also as shown in FIG. 9. Openings 157 and 158, which allow passage of retraction bars 33 and 32 respectively, as shown in FIG. 7, are oppositely positioned along the longitudinal axis of reciprocating bar 35. In addition, tips 80a and 80b of spring clip 80, side flaps 171 and 172, and structural support 173 of grasping portion 52, as shown in FIG. 12, are also shown.

A front view of reciprocating bar 35 is shown in FIG. 9, particularly revealing grasping portion 52, side flap 172, detent 174, and alignment means 159 through 167. These alignment means are shown as comprising protruding elements which serve as an alignment aid when positioning multiple tool deployment apparatus 30 upon rotary cutting tool retention pallet 38, as shown in FIG. 1. The distance between each alignment means 159 through 167 is slightly larger than that of pallet elements 67 through 74, as shown in FIG. 1. This increase in distance is provided so that adjacent ones of alignment means 159 through 167 can be positioned around the periphery of each of pallet elements 67 through 74, for example. Accordingly, this will enable effective seating, and alignment of reciprocating bar 35, and, in turn, multiple tool deployment apparatus 30 upon pallet 38. Also shown in FIG. 9 is tip 80a of spring clip.

Figure 10:
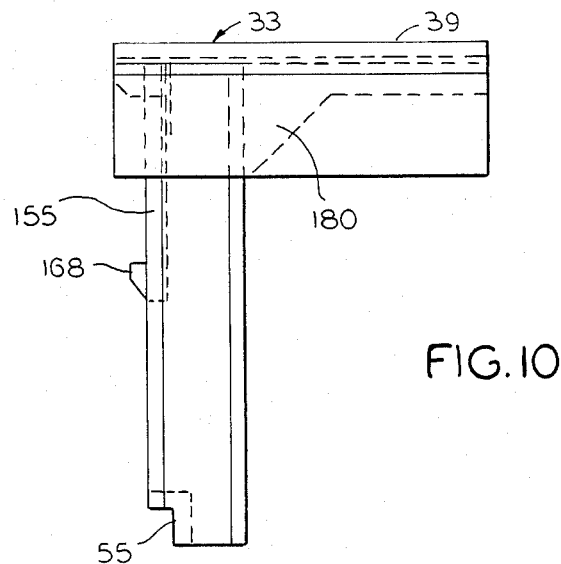
FIG. 10 is an elevated front view of the retraction bar, in partial phantom, showing the notched pallet locating means positioned at its bottom portion for cooperation with the pallet, as well as showing the spring biased securing notch for maintaining the retraction bar in position within the tool housing means.

Retraction bar 33, comprising top end 39 and bottom end 55 is shown in FIG. 10 and FIG. 11. Retraction bar 33 is designed with resilient retaining notch 168 which is operably positioned upon spring bar 155. Resilient retaining notch 168 cooperates with channel 156 of tool housing 31 so as to preclude the inadvertent overextension of shaft 169 of retraction bar 33 from channel 56, as shown in FIG. 7. Positioning portions 176 and 177 are configured with oblique angles, and are operably positioned on shaft 169 juxtaposed to top end 39 of retraction bar 33. These oblique angles are provided so as to facilitate a smooth seating process when top end 39 of retraction bar 33 is lowered, and eventually pressed against the top surface of grasping portion 54 of tool housing means 31, as shown in FIG. 2. In addition, corrosive wear caused by sharper angles will be greatly reduced, thereby prolonging the life and functionality of apparatus 30. Side flaps 180 and 181, of retraction bar 33, which are used for mechanically grasping retraction bar 33 during operable use, are also shown.

A side view of reciprocating bar 35 is shown in FIG. 12, particularly revealing the structural design of grasping portion 52. Detents 174 and 175 which are affixed to the bottom of side flaps 172 and 171 respectively, serve to cooperate with extended portions 84 and 85 of tool housing means 31, as shown in FIG. 3, so as to effectively limit the slidable movement of reciprocating bar 35 after reciprocating bar 35 has been appropriately aligned into an obstructed, or non-obstructed position. Furthermore, side flaps 172 and 171 are located on opposite sides of structural support 173 of reciprocating bar 35. Structural support provides the rigidity necessary to preclude breakage of the reciprocating bar 35 during the reciprocating manipulation. Top 170 of grasping portion 52 is slightly curved so as to reduce the likelihood of severing side flaps 172 and 171 when they are being squeezed. Alignment means 166, which cooperates with the pallet elements, such as pallet elements 67 through 74, as shown in FIG. 1, is also shown.

Figure 13:
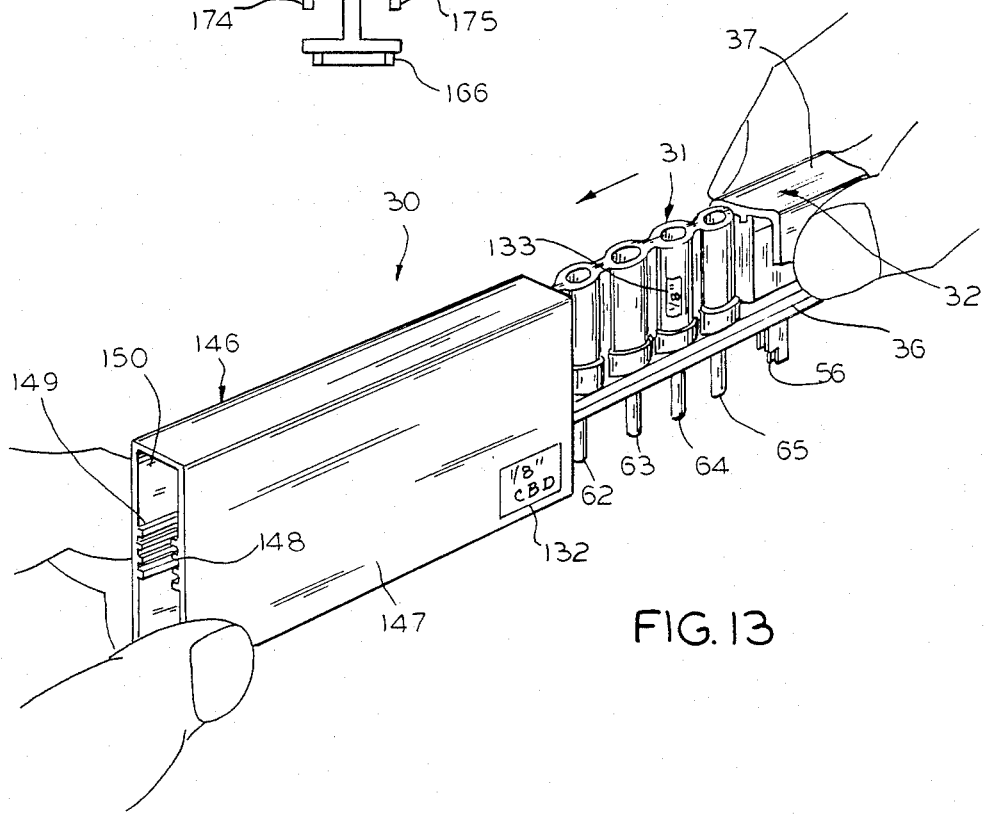
FIG. 13 of the drawings is a front elevational view of the multiple tool protective apparatus in its tool retaining position as further including a protective tool housing.

In FIG. 13, multiple tool deployment apparatus 30 is shown as it is being inserted into its protective housing cover 146. As can be seen, multiple tool deployment apparatus 30 is fully loaded with rotary cutting tools 58 through 65, as shown in FIG. 1. In order to effectively position tool housing means 31 into protective cover 146, top ends 37 and 39 of retraction bars 32 and 33, must be positioned so that bottom ends 56 and 57 are in their fully extended positions. When this is achieved, tool housing means 31 can be mechanically slid into interior 150 of protective housing cover 146. The external longitudinal lines of bottom region 36 of tool housing means 31 cooperate with internal ribs 148 and 149 so as to provide an interference fit therebetween, and, in turn, enable securement of tool housing 31 therewithin. In addition, indicia means 133 on tool housing 31, as well as indicia means 132 located on external surface 147 of protective tool cover 146, enable an operator to determine the physical specifications of rotary cutting tools 58 through 65, without having to remove them from tool housing means 31, or from protective housing cover 146.

In FIG. 14, multiple tool deployment apparatus 30 is shown just prior to the time when conventional rotary cutting tools 58 through 65 are about to be loaded within pallet elements 67 through 74 as shown in FIG. 1, respectively, of rotary cutting tool retention pallet means 38. Proper alignment of rotary cutting tools 58 through 65 is initiated by positioning tool housing means 31 over rotary cutting tool retention pallet 38, so that rotary cutting tools 58 through 65 are located directly over bores 136 through 143, as shown in FIG. 6, of pallet elements 67 through 74. When this is achieved, the chamfered corners of bottom ends 55 and 56 of retraction bar means 33 and 32, respectively, will be appropriately positioned in corresponding relationship to the edges of rotary cutting tool retention pallet 38. The extended positions of tips 80(a) and 80(b) of spring clip 80 reveal that reciprocating bar 35, as shown in FIG. 16, is in its tool obstructing position.

In FIG. 15, multiple tool deployment apparatus 30 is shown after it has been operably lowered upon top surface 66 of rotary cutting tool retention pallet 38. Once tool housing means 31 has been lowered onto rotary cutting tool retention pallet 38, appropriate seating of tool housing means 31 can be achieved by mechanically applying downward pressure upon top surface of isolation sleeves 40 through 47 in the direction of the arrow. Accordingly, as tool housing means 31 is pressed downward, bottom ends 55 and 56 of retraction bars 33 and 32, respectively, abut with top surface 66 of rotary cutting tool retention pallet 38. Once such abutment occurs, tool housing means 31 is actually pushed down over shafts 169 and 183 of retraction bars 33 and 32 respectively, until said tool housing 31 is precluded from any further downward movement. As a result, retraction bars 33 and 32 will become unseated from the top of grasping portion 54 of tool housing means 31, and top 170 of grasping portion 52, as shown in FIG. 12. Once tool housing 31 has been pushed down as far as it will go, bottom edge 57 of tool housing means 31 will abut with top surface 66 of rotary cutting tool retention pallet means 38, and, accordingly, bottom region 36 of tool housing means 31 will completely enshroud a specific geometric region of pallet elements, such as pallet elements 67 through 74, as shown in FIG. 1, with which multiple tool deployment apparatus 30 is intended to cooperate. FIG. 15 also shows tip 80(a) of spring clip 80 in its fully extended position even after tool housing means 31 has been pushed into its seated position upon pallet 38. Accordingly, such position reveals that reciprocating bar 35, as shown in FIG. 16, has not been altered from its tool obstructing position during the mechanical manipulation of multiple tool deployment apparatus 30 upon pallet 38.

In FIG. 16, multiple tool deployment apparatus 30 is shown after conventional rotary cutting tools 58 through 65 have been completely loaded within rotary cutting tool retention pallet means 38. Removal of multiple tool deployment apparatus 30 can then be accomplished by simply sliding reciprocating bar 35 into its non-obstructing position, which in turn, allows for the release of multiple tool deployment apparatus 30 from rotary cutting tool retention pallet means 38. Such reciprocating movement enables conventional rotary cutting tools 58 through 65 to remain within pallet elements 67 through 74 of rotary cutting tool retention pallet means 38, in a fully loaded position. Slidable movement of reciprocating bar means 35 is achieved by side means flaps 171 and 172 of grasping portion 52. As a result, detents 174 and 175, respectively, are released from their restricted position within extended portions 84 and 85, as shown in FIG. 3. Reciprocating bar 35 is then easily slid into its non-obstructing position by pulling it in the direction of the arrow, until tip 80(a) of spring clip 80 prohibits any further movement. Once this is achieved, multiple tool deployment apparatus 30 is ready for release from pallet 38.

Figure 20:
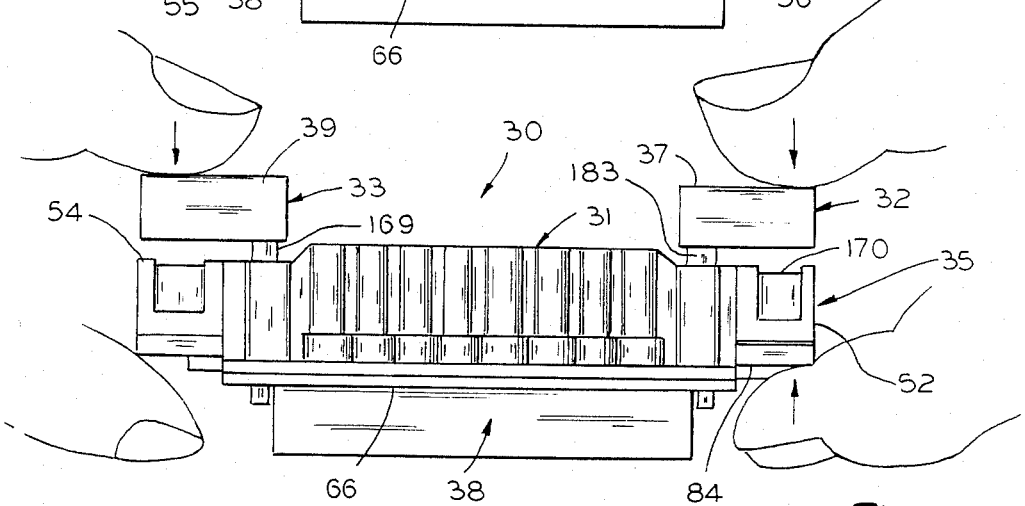

FIG. 17 shows multiple tool deployment apparatus 30 after conventional rotary cutting tools 58 through 65, as shown in FIG. 1, have been released from tool housing means 31. As apparatus 30 is being pulled vertically away from rotary cutting tool retention pallet means 38, gravity forces top ends 37 and 39 of retraction bars 32 and 33, respectively to drop down into their seated positions upon top 170 of grasping portion 52, and the top of grasping portion 54, respectively, of tool housing means 31, as shown in FIG. 20. When the conventional rotary cutting tools 58 through 65 are in their loaded positions within pallet elements 67 through 74, retaining collars, such as retaining collars 124 and 126, will abut with top surface of pallet elements, such as 69 and 71. Also, the cutting edge portions, such as cutting edge portions 82 and 83, of conventional rotary cutting tools, 58 through 65 will be in an exposed position. This exposed position is one of the reasons why multiple tool deployment apparatus 30 is so advantageous. Injury to a user during insertion or removal from rotary cutting tool retention pallet 38 is virtually avoided due to the lack of necessity to manually manipulate conventional rotary cutting tools. In addition, damage to the tools cutting edge portions, which may occur when tools are hit against one another during such manual manipulation, is also eliminated.

Figure 18:
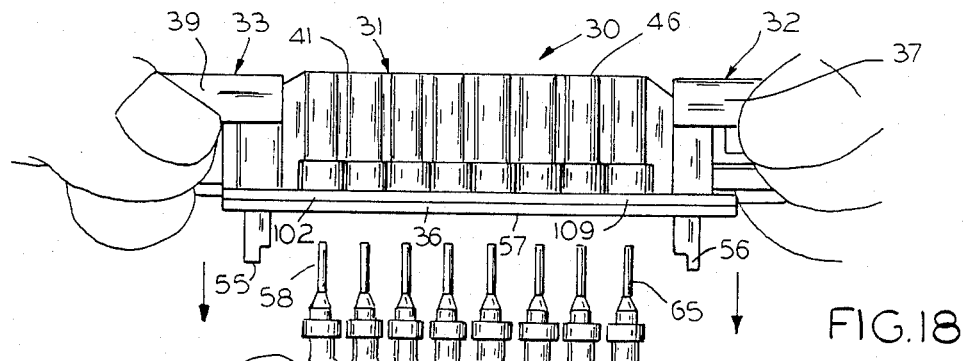
Figure 19:
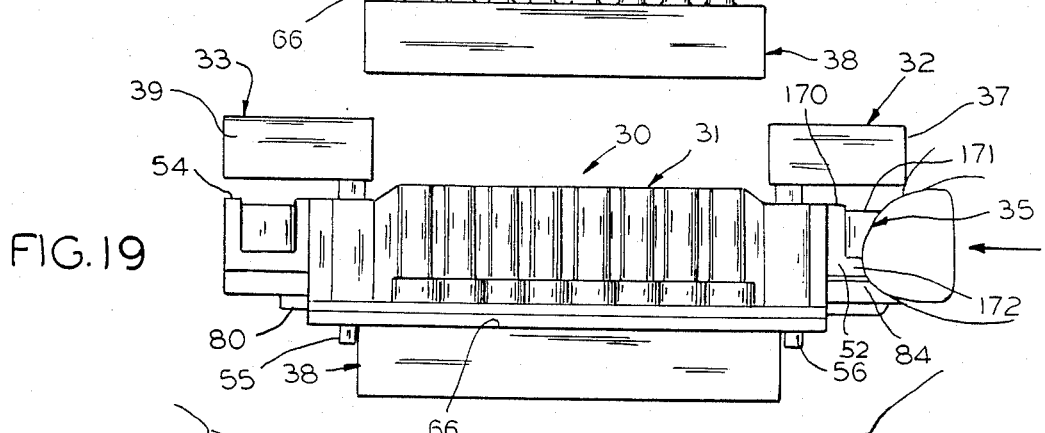

In FIG. 18, multiple tool deployment apparatus 30 is shown having isolation sleeves 40 through 47 of tool housing means 31, and, accordingly, their corresponding elliptically shaped voids, such as voids 102 and 109, of reciprocating bar 35, as shown in FIG. 19, aligned over conventional rotary cutting tools 58 through 65, which are loaded in rotary cutting tool retention pallet means 38. When such alignment has been obtained, bottom region 36 of tool housing means 31 can be lowered over rotary cutting tools 58 through 65 until bottom edge 57 of tool housing means 31 abuts with top surface 66 of rotary cutting tool retention pallet 38. As can be seen, an operator can make such an alignment by holding multiple tool deployment apparatus 30 at top ends 37 and 39 of retraction bars 32 and 33, respectively. As multiple tool deployment apparatus 30 is being lowered downward over the conventional rotary cutting tools, bottom ends 55 and 56 of retraction bars 33 and 32, respectively, will eventually seat upon edges of top surface 66 of rotary cutting tool retention pallet 38. Once bottom ends 55 and 56 are seated, further movement of retraction bars 33 and 32 is precluded. Accordingly, tool housing means 31 can then be slid down over shafts 169 and 183, as shown in FIG. 20 of retraction bars 33 and 32, respectively, until bottom edge 57 of tool housing means 31 is lowered into abutment with top surface 66 of pallet 38.

Multiple tool deployment apparatus 30 is shown in FIG. 19 after it has been completely lowered, and seated upon top surface 66 of rotary cutting tool retention pallet means 38. During the process which eventually leads to the appropriate seating of the apparatus bottom ends 55 and 56 of retraction bars 33 and 32 respectively, abut with top surface 66 of pallet 38. Accordingly, this allows tool housing means 31 to slide completely down shafts 169 and 183 of retraction bars 33 and 32, respectively, so that top ends 39 and 37 of retraction bars 33 and 32, respectively, are no longer seated upon top of grasping portion 54, and top 170 of grasping portion 52, respectively as seen in FIG. 20. Once tool housing means 31 has been appropriately seated, reciprocating bar means 35 is then manually slid in its tool obstructing position so as to secure rotary cutting tools 58 through 65, as shown in FIG. 1, within tool housing means 31. Such tool obstructing position is achieved by squeezing side flaps 172 and 171 of grasping portion 52, so as to release detents 174 and 175 from extended portions 84 and 85, respectively, as shown in FIG. 12 and FIG. 3, of tool housing means 31, thereby allowing the slidable movement of reciprocating bar 35. Grasping portion 52 is then manually pushed in the direction of the arrow, until grasping portion 52 abuts with tool housing means 31. As a result, spring clip 80 will be slid into its fully extended position. When such is achieved, multiple tool deployment apparatus 30 is ready for removal from rotary cutting tool retention pallet 38, along with conventional rotary cutting tools 58 through 65, as shown in FIG. 1, now positioned within tool housing means 31.

The method for retraction of multiple tool deployment apparatus 30, when removing conventional rotary cutting tools 58 through 65 from pallet elements 67 through 74, is further shown in FIG. 20. In order to effectively remove multiple tool deployment apparatus 30 from pallet 38, an operator may manually grasp top end 39 of retraction bar 33, and grasping portion 54 of tool housing means 31 between the thumb and forefinger of one hand, and simultaneously grasp top end 37 of retraction bar 32 and the bottoms of extending portions 84 and 85, as shown in FIG. 3, in a similar manner with the other hand. When this has been attained, the operator simply squeezes the thumb and forefingers on each respective hand, simultaneously, so as to allow the tool housing means 31 to slide upwardly over shafts 169 and 183 of retraction bars 33 and 32, respectively, until the top of grasping portion 54 of tool housing means 31, and top 170 of grasping portion 52 of reciprocating bar 35 abut with top ends 39 and 37 of retraction bars 33 and 32, respectively. Such tool removing ability is achievable since bottom ends 55 and 56 of retraction bars 33 and 32, respectively, as shown in FIG. 19, are pressed against top surface 66 of rotary cutting tool retention pallet means 38 during the entire removal process. This stationary positioning permits the appropriate amount of force to be applied to the bottom of multiple tool deployment apparatus 30 thereby permitting the upward thrust necessary to pull conventional rotary cutting tools 58 through 65 out of pallet elements 67 through 74, from rotary cutting tool retention pallet means 38.

Figure 21:
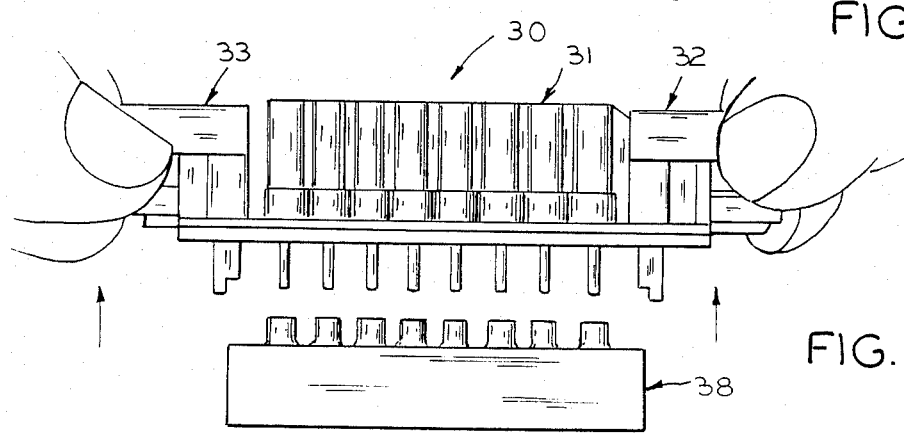

In FIG. 21, multiple tool deployment apparatus 30 is shown having each of conventional rotary cutting tools 58 through 65, positioned back into tool housing means 31 after said tools have been released from rotary cutting tool retention pallet means 38. An operator can now load or unload multiple tool deployment apparatus by simply grasping retraction bars 32 and 33 with thumb and forefinger and restarting the insertion process all over again, as first depicted in FIG. 14.

The foregoing description and drawings merely explain and illustrate the invention, and the invention is not limited thereto except insofar as the appended Claims are so limited, as those skilled in the art who have the disclosure before them will be able to make modifications and variations therein without departing from the scope of the invention.

What is claimed is:

1. A tool deployment apparatus for inserting, removing and otherwise deploying, one or more rotary cutting tools of the type having retaining collars, shank portions, and cutting edge portions, as well as for housing and shielding the cutting edge portions of said one or more rotary cutting tools during storage and handling of same, said tool deployment apparatus facilitating the insertion and removal of said one or more rotary cutting tools, respectively, into and from tool retention pallet means through cooperation therebetween, said tool retention pallet means being of the type having one or more operably spaced pallet elements, said pallet elements being capable of accepting and releasably retaining at least a portion of the shank portion of said one or more rotary cutting tools from their respective positions within said tool deployment apparatus, said tool deployment apparatus comprising:

tool housing means for retaining, orienting and aligning the position of each of said one or more rotary cutting tools relative to a respective one of said one or more pallet elements within said tool retention pallet means, said tool housing means having a top region and a bottom region opposite to said top region and further including one or more tool housing apertures positioned proximate to the tool housing means, for exposing at least a portion of said shank portions of said one or more rotary cutting tools, respectively, said tool housing means additionally including tool isolation means for isolating the cutting edge portions of at least one rotary cutting tool from inadvertent contact with adjacently positioned rotary cutting tools and other objects, said one or more tool housing apertures being configured in corresponding relationship to, and alignment with respective ones of said one or more pallet elements in said tool retention pallet means, for enabling aligned reciprocating deployment of said portion of exposed shank portion and, in turn, said respective rotary cutting tools, respectively, from and back into said tool housing means; and tool channeling means operably positioned proximate to said tool housing apertures for, alternatively, obstructing the release of said one or more rotary cutting tools from said tool housing means, through said tool housing apertures, and releasing said one or more rotary cutting tools through said tool housing apertures, so as to enable transmission of said aligned ones of said one or more rotary cutting tools from within said tool housing means, to and into said respective pallet elements of said tool retention pallet means.

2. The tool deployment apparatus according to claim 1 in which the invention further comprises:

tool channeling means configured to enable the retransmission of said one or more aligned rotary cutting tools from said tool retention pallet means, back into said tool housing means, through said plurality of tool housing apertures, for securement therewithin said tool housing means by said tool channeling means upon adoption of its obstructing position.

3. The tool deployment apparatus according to claim 2 in which the invention further comprises:

retraction bar means operably positioned for cooperation with said tool housing means, to facilitate the simultaneous removal of said one or more rotary cutting tools, collectively, from said respective aligned pallet elements of said tool retention pallet means, during said re-transmission of said one or more aligned rotary cutting tools, towards and back into said tool housing means, said retraction bar means having a force application end and a pallet contact end, with said force application end being operably juxtaposed substantially proximate to said top region of said tool housing means, said tool housing apertures being positioned along said bottom region of said tool housing means, said pallet contact end being operably juxtaposed substantially proximate to said bottom region of said tool housing means.

4. The invention according to claim 3 in which said retraction bar means further includes pallet locating means operably positioned at said pallet contact end of said retraction bar means, for facilitating the alignment of said retraction bar means and, in turn, said tool housing means in aligned position atop said tool retention pallet means upon re-transmission of said one or more aligned rotary cutting tools from said tool retention pallet means back into said tool housing means.

5. The invention according to claim 2 in which said tool channeling means comprises:

reciprocating bar means, having a first end and a second end opposite to said first end, said reciprocating bar means being positioned substantially adjacent the bottom region of said tool housing means, for providing slidable, reciprocatable, alternating obstruction and transmission of said tool housing aperture means, to in turn, alternatively block and release for passage respectively, therethrough, said rotary cutting tools operably positioned within said tool housing means;

said reciprocating bar means having one or more bar apertures configured therewithin capable of alternative misalignment and alignment with said tool housing apertures of said tool housing means, respectively, said obstruction of said rotary cutting tools within said tool housing means occurring upon said misalignment of said one or more bar apertures relative to said one or more tool housing apertures, said alternative transmission of said rotary cutting tools occurring upon said alignment of said one or more bar apertures relative to said one or more tool housing apertures, respectively.

6. The invention according to claim 5 in which said reciprocating bar means further includes reciprocation restraint means integrally attached to said second end of said reciprocating bar means, so as to restrain and control reciprocation of said reciprocating bar means to ensure appropriate alignment of said one or more bar apertures for transmission of said rotary cutting tools through respective ones of said one or more tool housing apertures of said tool housing means, thereby permitting the releasable transmission of one or more of said rotary cutting tools from said tool housing means to said pallet means and retransmission of same from said pallet means back to and into said tool housing means,
said reciprocation restraint means further maintaining said reciprocating bar means in operable affixation to said tool housing means.

7. The invention according to claim 6 in which said reciprocation restraint means comprises anchor means located at said second end of said reciprocating bar means capable of engagement with at least a portion of said tool housing means proximate to said second end,
said anchor means enabling said reciprocating bar means to reciprocate distinctly between its aligned and next adjacent non-aligned position, respectively.

8. The invention according to claim 5 in which said one or more bar apertures of said reciprocating bar means are substantially elliptically shaped, each elliptical shape thereof having a narrow portion and a wide portion, whereby said narrow portion of said elliptically shaped bar apertures serve to at least partially obstruct alignment of the bar apertures with respective ones of said tool housing apertures to, in turn, obstruct the opportunity for transmission of said one or more rotary cutting tools from and back into said tool housing means when said reciprocating bar means is in its said transmission obstructing position.

9. The invention according to claim 5 in which said reciprocating bar means further comprises grasping means operably attached thereto at said first end, to facilitate manual operation and mechanical positioning of said reciprocating bar means, and, to in turn, enable the positioning of said one or more bar apertures, into either of said alternative obstructing or non-obstructing positions, relative to said tool housing apertures in said tool housing means, to, in turn, alternatively preclude and transmit passage of said rotary cutting tools therethrough, for retention by, and re-transmission from, respective ones of said pallet elements.

10. The invention according to claim 9 in which said grasping means includes limiting means for operably and distinctly describing desired alternative positions for locating of of said reciprocating bar means;
said limiting means comprising one or more biased detents located in said grasping means for releasable fastening into mated notch elements in said tool housing means.

11. The invention according to claim 1 in which said tool isolation means of said tool housing means comprises one or more substantially cylindrically shaped enclosure elements for shielding at least one of said one or more rotary cutting tools, respectively, within said tool housing means;
said one or more substantially cylindrically shaped enclosure elements extending from said top region to the bottom region of said tool housing means, so as to enshroud and isolate the entirety of at least the cutting edge portions of said at least one rotary cutting tool positioned within said tool housing means,
said one or more substantially cylindrically shaped enclosure elements including, at said bottom region, diameters configured to slidingly accept said retaining collar of said rotary cutting tool, said retaining collar further being maintained at said bottom region by shoulder means positioned within said enclosure element.

12. The invention according to claim 11 in which the portion of said one or more tool isolation means proximate to said top region of said tool housing means, further includes an opening for facilitating inspection and mechanical manipulation of said cutting edge portions of said rotary cutting tools enclosed within said tool isolation means.

13. The invention according to claim 2 in which said tool housing apparatus is configured along one dimension so as to contain a linear row of said rotary cutting tools in corresponding alignment with an alignable linear row of said pallet elements embodied by said tool retention pallet means,
said linear row of said rotary cutting tools being capable of being simultaneously transmitted to and retransmitted from said alignable linear row of said pallet elements embodied by said tool retention pallet means.

14. The invention according to claim 2 in which said tool housing apparatus is configured along two dimensions to contain a two-dimensional geometric array of said rotary cutting tools in corresponding alignment with an alignable two-dimensional geometric array of said pallet elements embodied by said tool retention pallet means,
said two-dimensional geometric array of said rotary cutting tools being capable of being simultaneously transmitted to and re-transmitted from said alignable two dimensional geometric array of said pallet elements embodied by said tool retention pallet means.

15. The tool deployment apparatus according to claim 1 in which the invention further includes indicia means operably and visibly applied to said tool housing means so as to facilitate the identification of structural specifications relevant to said rotary cutting tools contained therewithin.

16. The tool deployment apparatus according to claim 1 in which the invention further includes apparatus containment means for sealing said tool housing means, and the rotary cutting tools contained therewithin for storage, handling, and shipping purposes;
said apparatus containment means comprising a containment sleeve capable of being telescopically positioned about said tool housing means.

17. The invention according to claim 16 in which said apparatus containment means is maintained in its position about said tool housing means by means of an interference fit with portions of said tool housing means.

18. The invention according to claim 16 in which both said apparatus containment means and said tool housing means embody a substantially transparent material so as to enable the visual observation of said rotary cutting tools contained therewithin said tool deployment apparatus.

19. The invention according to claim 16 in which said apparatus containment means further includes indicia means operably and visibly applied to said apparatus containment means so as to facilitate the identification of structural specifications relevant to said rotary cutting tools contained therewithin.

20. The invention according to claim 1 in which said tool housing means and tool channeling means are each fabricated of a substantially rigid plastic material.

* * * * *